United States Patent
Shin

(10) Patent No.: US 9,823,830 B2
(45) Date of Patent: Nov. 21, 2017

(54) METHOD FOR MANAGING A LIST AND ELECTRONIC DEVICE THEREOF

(71) Applicant: Samsung Electronics Co., Ltd., Suwon-si, Gyeonggi-do (KR)

(72) Inventor: Sang-Min Shin, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 876 days.

(21) Appl. No.: 14/155,866

(22) Filed: Jan. 15, 2014

(65) Prior Publication Data

US 2014/0250408 A1    Sep. 4, 2014

(30) Foreign Application Priority Data

Mar. 4, 2013    (KR) .................. 10-2013-0022946

(51) Int. Cl.
*G06F 3/0485*    (2013.01)

(52) U.S. Cl.
CPC .................................. *G06F 3/0485* (2013.01)

(58) Field of Classification Search
None
See application file for complete search history.

(56) References Cited

U.S. PATENT DOCUMENTS

| 2010/0085318 A1* | 4/2010 | Lee ................. G06F 3/04883 345/173 |
| 2010/0164895 A1* | 7/2010 | Kim ................. G06F 3/0488 345/173 |
| 2010/0250110 A1* | 9/2010 | Kaji ................. G01C 21/3611 701/532 |
| 2012/0023416 A1 | 1/2012 | Khoo |
| 2013/0097526 A1* | 4/2013 | Stovicek ............ G06Q 10/107 715/752 |
| 2013/0097640 A1* | 4/2013 | Lemmons .......... H04N 5/44543 725/46 |
| 2013/0159875 A1* | 6/2013 | Ahiakpor ............ G06Q 10/109 715/752 |

\* cited by examiner

*Primary Examiner* — Tuan S Nguyen
(74) *Attorney, Agent, or Firm* — Jefferson IP Law, LLP

(57) ABSTRACT

A method of managing a list in an electronic device is provided. The method includes displaying the list, determining whether scrolling on the list occurs, determining whether there is at least one item that satisfies a reference condition for displaying a shortcut on the upper end of the list, if the scrolling on the list occurs, and displaying, on the upper end of the list, the shortcut for the at least one item that satisfies the reference condition, if there is at least one item that satisfies the reference condition.

25 Claims, 14 Drawing Sheets

METHOD FOR MANAGING A LIST AND ELECTRONIC DEVICE THEREOF

CROSS-REFERENCE TO RELATED APPLICATION(S)

This application claims the benefit under 35 U.S.C. §119(a) of a Korean patent application filed on Mar. 4, 2013 in the Korean Intellectual Property Office and assigned Serial No. 10-2013-0022946, the entire disclosure of which is hereby incorporated by reference.

TECHNICAL FIELD

The present disclosure relates to a method for managing a list and an electronic device thereof. More particularly, the present disclosure relates to a method and device for displaying a list in an electronic device.

BACKGROUND

A portable electronic device is developing into a multimedia device that provides various multimedia services using a data communication service in addition to a voice call service as a result of the development of a communication technology. Moreover, the electronic device may provide various services such as a camera function, an interne function, an MP3 player function, a scheduling function, and an email service.

The email service is one of important communication means for personal and corporate users. As the email service takes a place as cooperation and communication means in the company, dependency on emails is increasing. As work dependency on the emails increases, the exposure of an email address naturally increases and thus undesired emails are often received.

When an electronic device user uses an email service, the user generally begins by deleting spam mails. The spam emails correspond to massive emails that are indiscriminately delivered to people having email addresses, and the senders of the spam emails send the emails to recipients unrelated to the senders.

If it is assumed that a list of emails includes thousands of emails, the electronic device user will consume a lot of time so as to find desired emails except for spam emails. Thus, the electronic device needs a method of quickly finding desired mails among numerous emails.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for displaying a list in an electronic device.

Another aspect of the present disclosure is to provide a method and device for displaying a shortcut for at least one item that satisfies a reference condition if scrolling through a list occurs on an electronic device.

Another aspect of the present disclosure is to provide a method and device for displaying a shortcut for at least one item that satisfies a reference condition if scrolling a list at a speed equal to or higher than a reference speed occurs on an electronic device.

Another aspect of the present disclosure is to provide a method and device for re-arranging and displaying at least one item that satisfies a reference condition if scrolling a list occurs on an electronic device.

Another aspect of the present disclosure is to provide a method and device for re-arranging and displaying at least one item that satisfies a reference condition if scrolling a list at a speed equal to or higher than a reference speed occurs on an electronic device.

In accordance with an aspect of the present disclosure, a method of managing a list in an electronic device is provided. The method includes displaying the list, determining whether scrolling on the list occurs, determining whether there is at least one item that satisfies a reference condition for displaying a shortcut on the upper end of the list, if the scrolling on the list occurs, and displaying, on the upper end of the list, the shortcut for the at least one item that satisfies the reference condition, if there is at least one item that satisfies the reference condition.

In accordance with another aspect of the present disclosure, a method of managing a list in an electronic device is provided. The method includes displaying the list, determining whether scrolling on the list occurs, determining whether there is at least one item that satisfies a reference condition for re-arranging the list, if the scrolling on the list occurs, and determining whether the scrolling on the list stops, re-arranging and displaying, on the upper end of the list, the at least one item that satisfies the reference condition, if the scrolling on the list stops.

In accordance with another aspect of the present disclosure, an electronic device is provided. The electronic device includes at least one processor, at least one memory, and at least one program stored in the memory, wherein the at least one program is configured to be executable by the at least one processor and the at least one processor is configured to: display a list, determine whether scrolling on the list occurs, determine whether there is at least one item that satisfies a reference condition for displaying a shortcut on the upper end of the list, if the scrolling on the list occurs, and display, on the upper end of the list, the shortcut for the at least one item that satisfies the reference condition, if there is at least one item that satisfies the reference condition.

In accordance with another aspect of the present disclosure, an electronic device is provided. The electronic device includes at least one processor, at least one memory, and at least one program stored in the memory, wherein the at least one program is configured to be executable by the at least one processor and the at least one processor is configured to: display a list, determine whether scrolling on the list occurs, determine whether there is at least one item that satisfies a reference condition for re-arranging the list, if the scrolling on the list occurs, and re-arrange and display, on the upper end of the list, the at least one item that satisfies the reference condition, if the scrolling on the list stops.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method for displaying a shortcut for an item on the upper end of a list in an electronic device or re-arranging and displaying the list and an electronic device thereof.

In addition, the present disclosure relates to a technology to manage at least one item that satisfies a reference condition when scrolling a list in an electronic device occurs.

In the following, an electronic device will be described along with an example of a technology to manage at least one mail that satisfies a reference condition when scrolling a list of mail occurs. According to various embodiments of the present disclosure, the mail may correspond to email, Short Message Service (SMS), Multimedia Messaging Service (MMS), instant messaging, and/or the like.

The electronic device may include, a mobile communication terminal, a Personal Digital Assistant (PDA), a Personal Computer (PC), a laptop, a smart phone, a net book, a television, a Mobile Internet Device (MID), Ultra Mobile PC (UMPC), a tablet PC, a navigation device, a smart TV, an MP3 player, a Portable/Personal Multimedia Player (PMP), a handheld e-book, a set-top box, a digital camera, and the like in the following description.

Figure 1:
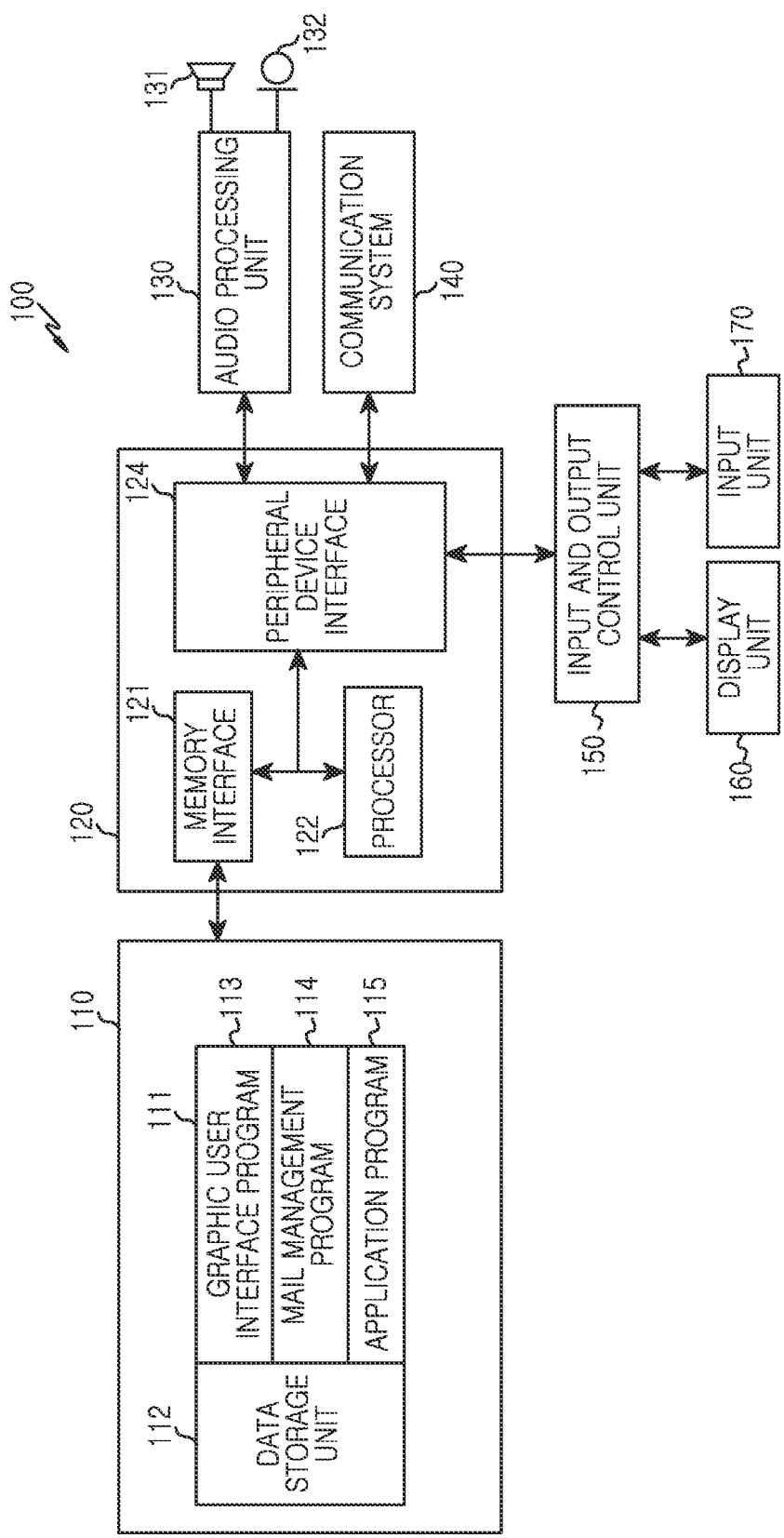
FIG. 1 is a block diagram of an electronic device according to an embodiment of the present disclosure.

FIG. 1 is a block diagram of an electronic device according to an embodiment of the present disclosure.

Referring to FIG. 1, an electronic device 100 may include a memory 110, a processor unit 120, an audio processing unit 130, a communication system 140, an input and output control unit 150, a display unit 160, and an input unit 160. According to various embodiments of the present disclosure, the electronic device 100 may include a plurality of the memory 110.

The memory 110 may include a program storage unit 111 that stores programs for controlling the operation of the electronic device 100, and a data storage unit 112 that stores data generated when executing the programs. For example, the data storage unit 112 stores at least one of mail addresses that are set through a mail management program 114, set keywords, sent mail addresses, checked mail addresses, mail addresses sent during a reference period, and mail addresses checked during a reference period. As another example, the data storage unit 112 may temporarily store information on at least one mail through the mail management program 114.

The program storage unit 111 may include a Graphic User Interface (GUI) program 113, a mail management program 114, and at least one application program 115. The programs that are included in the program storage unit 111 are a set of instructions and may be represented as an instruction set.

The GUI program 113 may include at least one software component for providing a GUI onto the display unit 160. For example, the GUI program 113 controls the mail management program 114 so that a list of mail is displayed on the display unit 160. As another example, the GUI program 113 may control the mail management program 114 so that a shortcut for at least one mail is displayed on the upper end of the list of mail. As another example, the GUI program 113 may control the mail management program 114 so that at least one mail is re-arranged and displayed on the upper end of the list of mail.

The mail management program 114 may include at least one software component for displaying, on the upper end of the list of mail, a shortcut for at least one mail that satisfies a reference condition. For example, if scrolling the list of mail occurs after controlling the GUI program 113 so that the list of mail is displayed, the mail management program 114 determines whether there is at least one mail that satisfies reference condition for allowing a shortcut to be displayed on the upper end of the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period. Subsequently, the mail management program 114 controls the GUI program 113 so that a shortcut for at least one mail that satisfies a reference condition is displayed on the upper end of a list of mail. Furthermore, if scrolling the list of mail occurs, the mail management program 114 may determine whether there is a mail that satisfies a reference condition when the scrolling speed is equal to or higher than a reference speed.

The mail management program 114 may include at least one software component for re-arranging and displaying, on the upper end of the list of mail, at least one mail satisfying the reference condition. For example, if scrolling the list of mail occurs after controlling the GUI program 113 so that the list of mail is displayed, the mail management program 114 determines whether there is at least one mail that satisfies a reference condition for allowing the list of mail to be re-arranged and displayed. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period. Subsequently, if the scrolling stops, the mail management program 114 controls the GUI program 113 so that at least one mail that satisfies the reference condition is re-arranged and displayed on the upper end of the list of mail. Furthermore, if scrolling the list of mail occurs, the mail management program 114 may determine whether there is a mail that satisfies the reference condition when the scrolling speed is equal to or higher than a reference speed.

The application program 115 may include software components for at least one application program that is installed in the electronic device 100.

The processor unit 120 may include a memory interface 121, at least one processor 122, and a peripheral device interface 124. The memory interface 121, the at least one processor 122, and the peripheral device interface 124 that are included in the processor unit 120 may be implemented in at least one integrated circuit or separate components.

The memory interface 121 controls an access of components such as the processor 122 or the peripheral device interface 124 to the memory.

The peripheral device interface 124 controls a connection of the input and output peripheral device of the electronic device 100 to the processor 122 and the memory interface 121.

The processor 122 controls the electronic device by using at least one software program so that the electronic device 100 provides various multimedia services. In this case, the processor 122 executes at least one program stored in the memory 110 so as to provide a service according to a corresponding program.

The audio processing unit 130 provides an audio interface between a user and the electronic device 100 through the speaker 131 and/or the microphone 132.

The communication system performs a communication function for voice and data communications. According to various embodiments of the present disclosure, the communication system 140 may be divided into a plurality of communication sub modules that support different communication networks. For example, the communication network may include, but is not limited to, a Global System for Mobile Communications (GSM) network, an Enhanced Data Rates for GSM Evolution (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a wireless Local Area Network (LAN), a Bluetooth network, a Near Field Communication (NFC) network, and the like.

The input and output control unit 150 provides an interface between an input and output unit such as the display unit 160 and the input unit 170, and the peripheral device interface 124.

The display unit 160 displays state information on the electronic device 100, texts input by a user, moving pictures and still images. For example, the display unit 160 displays a list of mail according to the control of the GUI program 113. As another example, the display unit 160 may display, on the upper end of the list of mail, a shortcut for at least one mail according to the control of the GUI program 113. As another example, the display unit 160 may also re-arrange and display at least one mail on the upper end of the list of mail according to the control of the GUI program 113.

The input unit 170 provides input data generated by user selection to the processor unit 120 through the input and output control unit 150. In this case, the input unit 170 may include a keypad that includes at least one hardware button, and a touch pad that senses touch information. For example, the input unit 170 provides touch information detected through the touch pad to the processor 122 through the input and output control unit 150.

Figure 2:
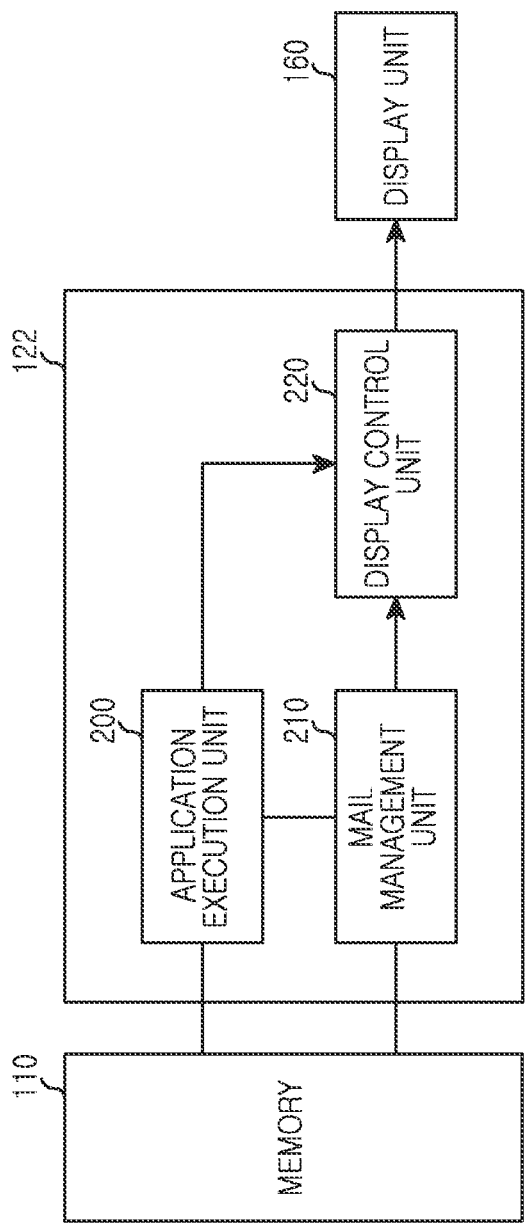
FIG. 2 is a detailed block diagram of a processor according to an embodiment of the present disclosure.

FIG. 2 is a detailed block diagram of a processor according to an embodiment of the present disclosure. FIGS. 9A, 9B, 9C, and 9D are screen configurations for providing a mail service in an electronic device according to an embodiment of the present disclosure.

Referring to FIG. 2, the processor 122 may include an application program execution unit 200, a mail management unit 210, and a display control unit 220.

The application program execution unit 200 executes at least one application program 115 stored in the program storage unit 111 and provides a service according to a corresponding application program. For example, the application program execution unit 200 controls the mail management unit 210 so that a mail service is provided.

The mail management unit 210 executes the mail management program 114 stored in the program storage unit 111 and controls the mail management program 114 so that a shortcut for at least one mail satisfying a reference condition is displayed on the upper end of a list of mail. For example, if scrolling a list of mail occurs after controlling the display control unit 220 so that the list of mail is displayed, the mail management unit 210 determines whether there is at least one mail that satisfies reference condition for allowing a shortcut to be displayed on the upper end of the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period. Subsequently, the mail management unit 210 controls the display control unit 220 so that a shortcut for at least one mail that satisfies a reference condition is displayed on the upper end of a list of mail. Furthermore, if scrolling the list of mail occurs, the mail management unit 210 may determine whether there is a mail that satisfies a reference condition when the scrolling speed is equal to or higher than a reference speed.

The mail management unit 210 executes the mail management program 114 stored in the program storage unit 111 and controls the mail management program 114 so that at least one mail satisfying a reference condition is re-arranged and displayed on the upper end of a list of mail. For example, if scrolling the list of mail occurs after controlling the display control unit 220 so that the list of mail is displayed, the mail management unit 210 determines whether there is at least one mail that satisfies a reference condition for allowing the list of mail to be re-arranged and displayed. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period. Subsequently, if the scrolling stops, the mail management unit 210 controls the display control unit so that at least one mail that satisfies the reference condition is re-arranged and displayed on the upper end of the list of mail. Furthermore, if scrolling the list of mail occurs, the mail management unit 210 may determine whether there is a mail that satisfies the reference condition when the scrolling speed is equal to or higher than a reference speed.

The display control unit 220 executes the GUI program 113 stored in the program storage unit 111 and controls the GUI program 113 so that a graphic user interface is displayed. For example, the display control unit 220 controls the mail management unit 210 so that a list of mail is displayed on the display unit 160. As another example, the display control unit 220 may control the mail management unit 210 so that a shortcut for at least one mail is displayed on the upper end of the list of mail. As another example, the display control unit 220 may control the mail management unit 210 so that at least one mail is re-arranged and displayed on the upper end of the list of mail.

According to various embodiments of the present disclosure, the electronic device 100 uses the processor 122 including the mail management unit 210 control a display of at least one mail that satisfies a reference condition.

According to various embodiments of the present disclosure, the electronic device 100 may also include a separate mail service control module that controls a display of at least one mail that satisfies a reference condition.

Figure 3A:
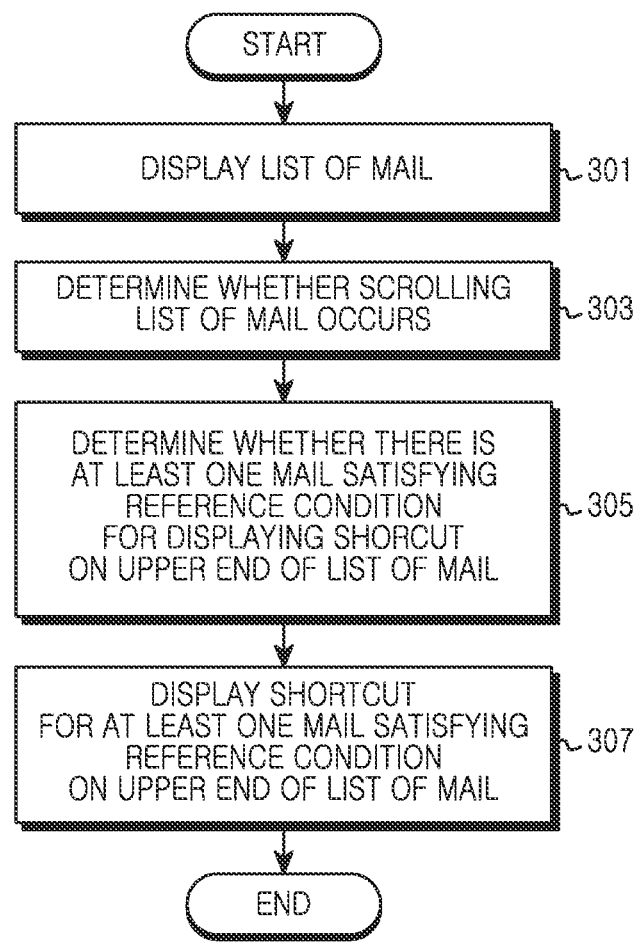
FIG. 3A is a flow chart of a procedure for displaying, on an upper end of a list of mail, a shortcut for at least one mail that satisfies a reference condition in an electronic device according to an embodiment of the present disclosure.

FIG. 3A is a flow chart of a procedure for displaying, on an upper end of a list of mail, a shortcut for at least one mail that satisfies a reference condition in an electronic device according to an embodiment of the present disclosure.

Figure 9A:
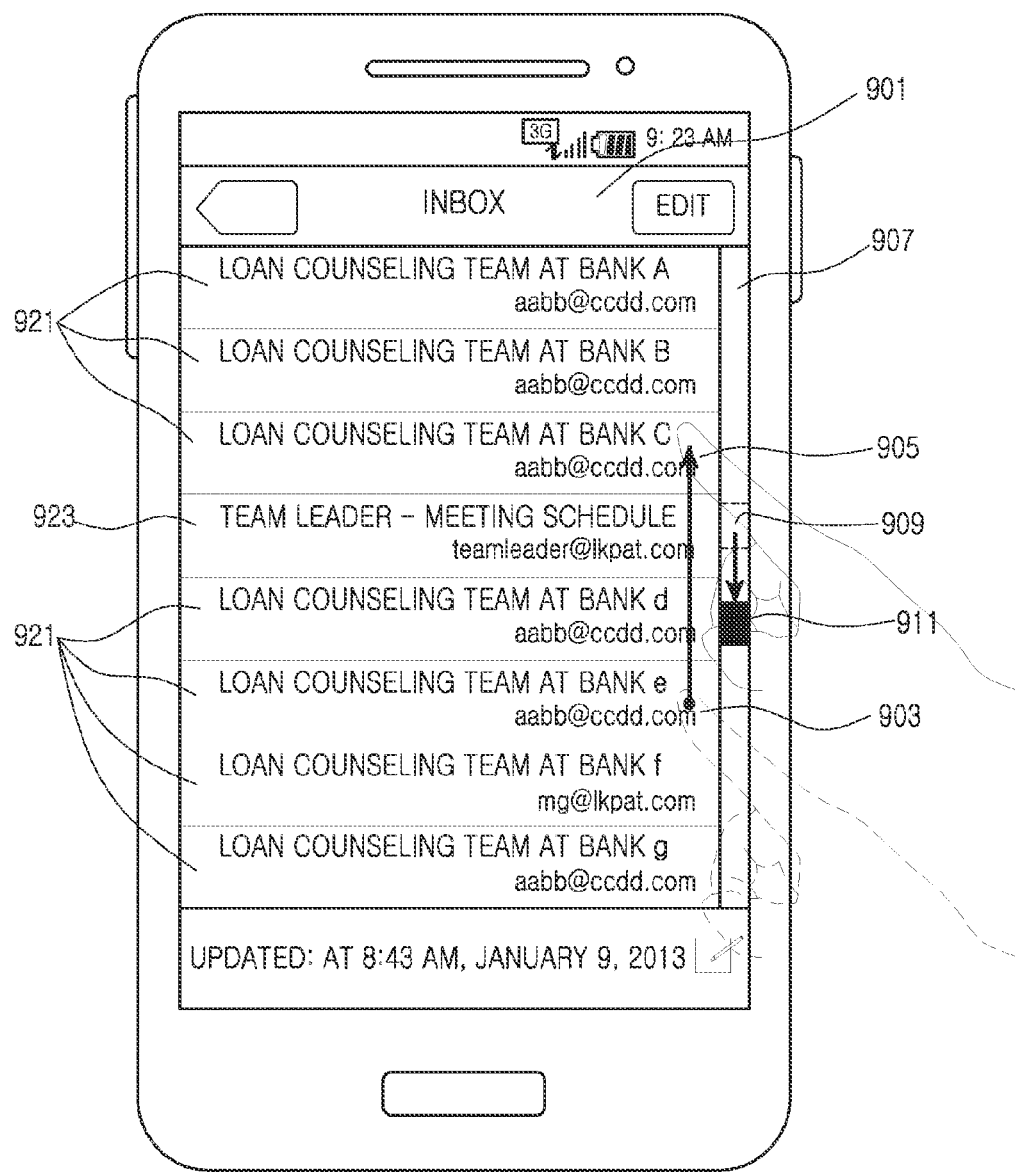
FIGS. 9A, 9B, 9C, and 9D are screen configurations for providing a mail service in an electronic device according to an embodiment of the present disclosure.

Referring to FIG. 3A, at operation 301, the electronic device displays a list of mail. For example, as illustrated in FIG. 9A, the electronic device displays the list of mail 901 including mail 921 on the display unit 160, if a mail service is executed according to input information provided through the input unit 170.

After displaying the list of mail, the electronic device proceeds to operation 303 at which the electronic device determines whether scrolling on the list of mail occurs. For example, as illustrated in FIG. 9A, the electronic device determines, on the basis of input information provided through the input unit 170, whether dragging from a first point 903 to a second point 905 is detected. If the scrolling on the list of mail does not occur, the electronic device maintains a display of the list of mail.

When the scrolling on the list of mail occurs at operation 303, the electronic device proceeds to operation 305 and determines whether there is at least one mail that satisfies a reference condition for displaying a shortcut on the upper end of the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

Figure 9B:
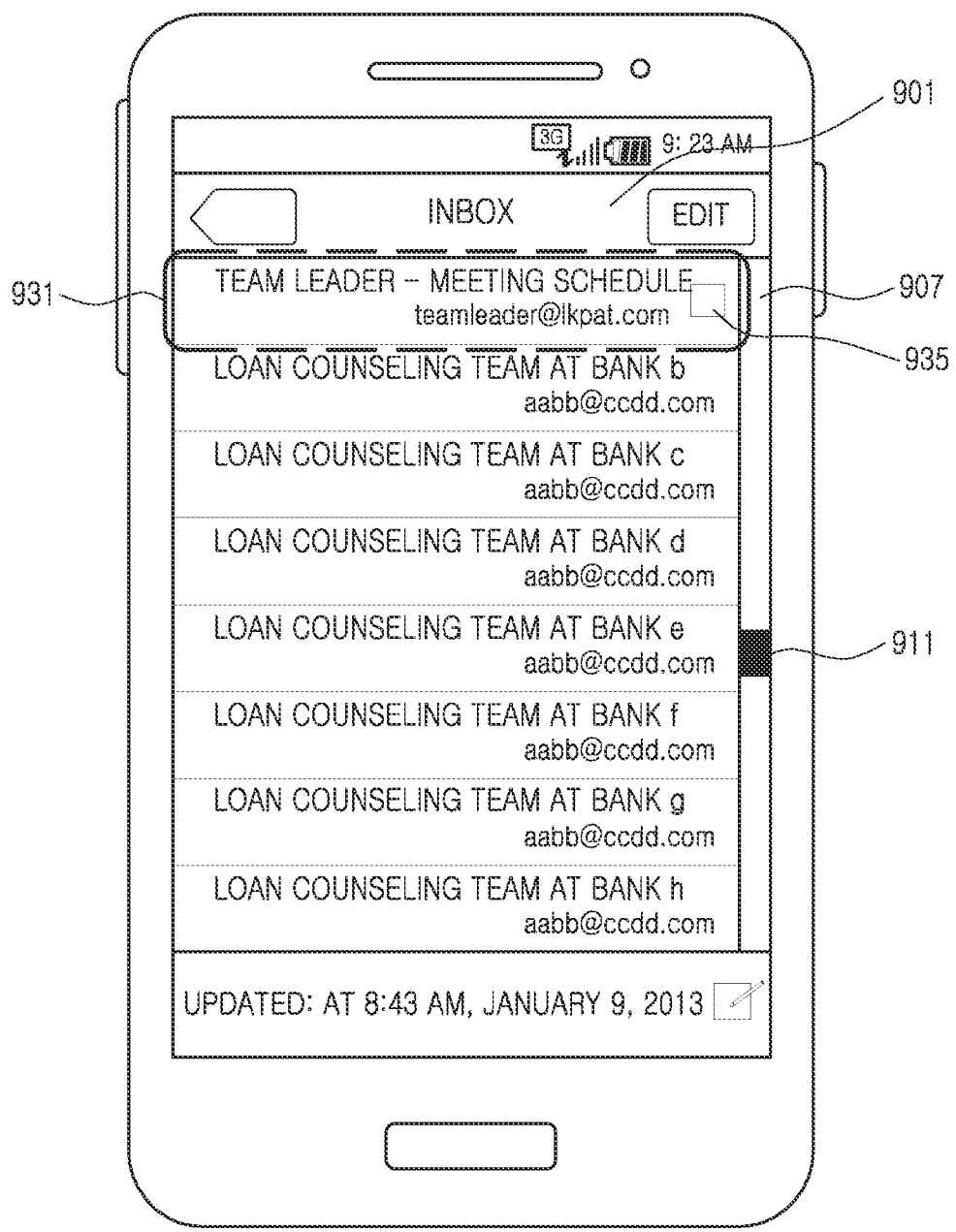
Figure 9C:
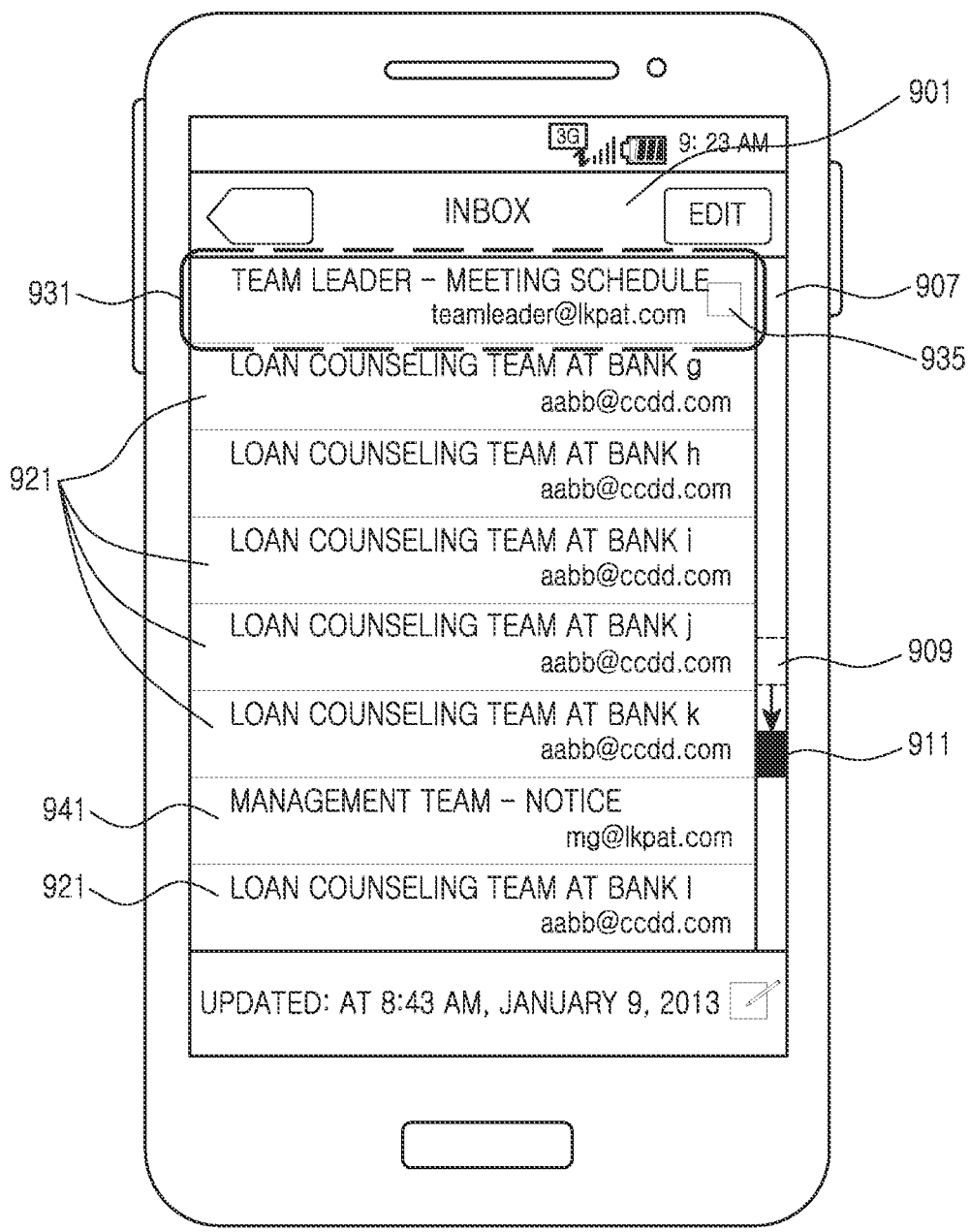
Figure 9D:
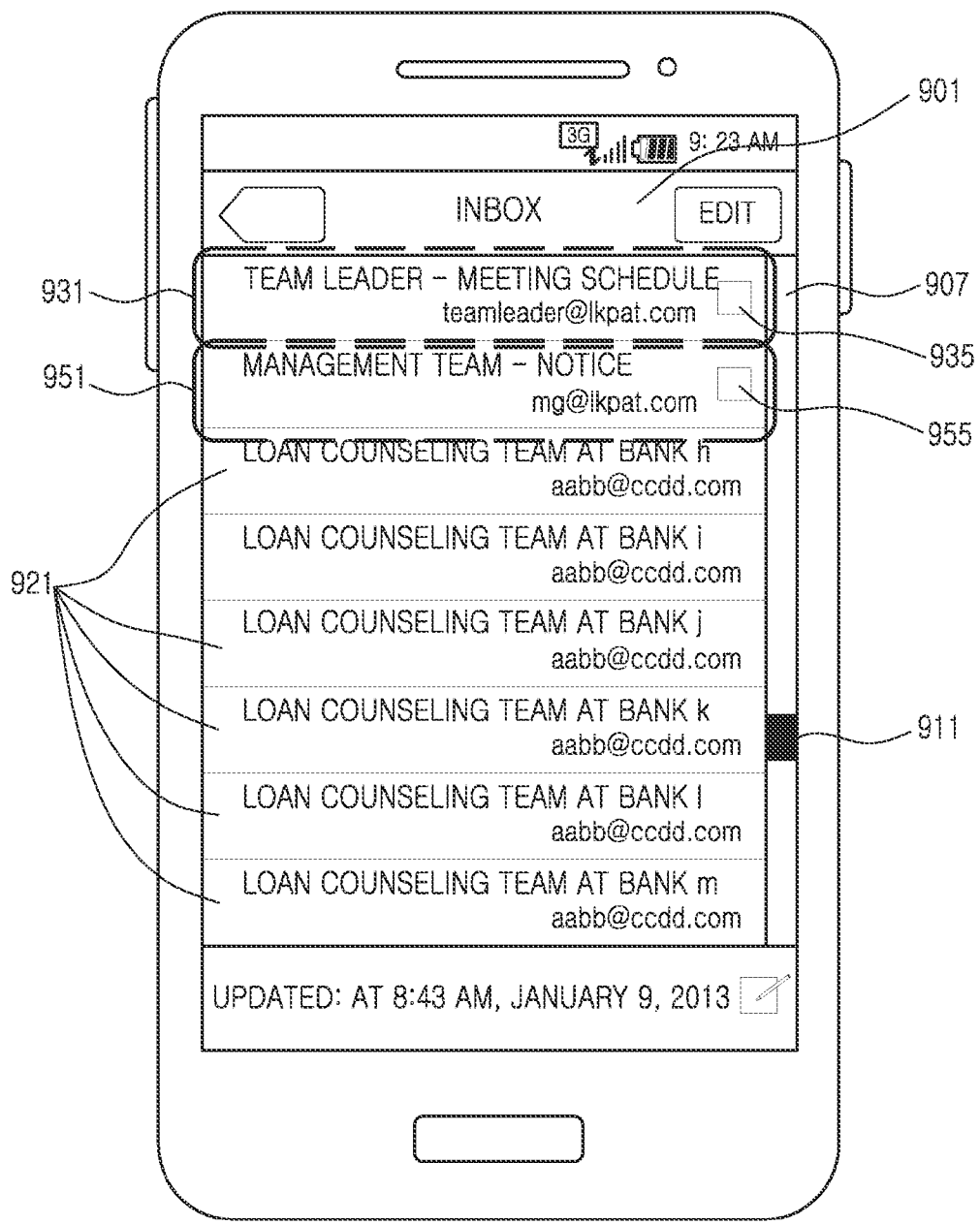

Subsequently, the electronic device proceeds to operation 307 and displays, on the upper end of the list of mail, the shortcut for at least one mail that satisfies the reference condition. The process of displaying the shortcut for a mail on the upper end of the list of mail is assumed to include the process of updating the list of mail. For example, as illustrated in FIG. 9A, if the mail address "teamleader@lkpat.com" is a set mail address, then, as illustrated in FIG. 9B, the electronic device displays a mail 931 including the mail address "teamleader@lkpat.co.kr" 923, as a shortcut on the upper end of the list of mail 901. As another example, as illustrated in FIG. 9C, if the word "notice" is a set keyword, the electronic device may display a mail including the word "notice" 941 as illustrated in FIG. 9C, and as illustrated in FIG. 9D, may display a mail 951 including the word "notice" as a shortcut on the upper end of the list of mail 901. In this case, the electronic device may display a menu 935 and 955 for canceling a display of a shortcut for a mail or for storing the mail in a separate mail folder.

Furthermore, if the scrolling on the list of mail occurs, the electronic device may determine whether there is a mail that satisfies the reference condition, when the scrolling speed is equal to or higher than a reference speed.

Thereafter, the electronic device terminates the process.

Figure 3B:
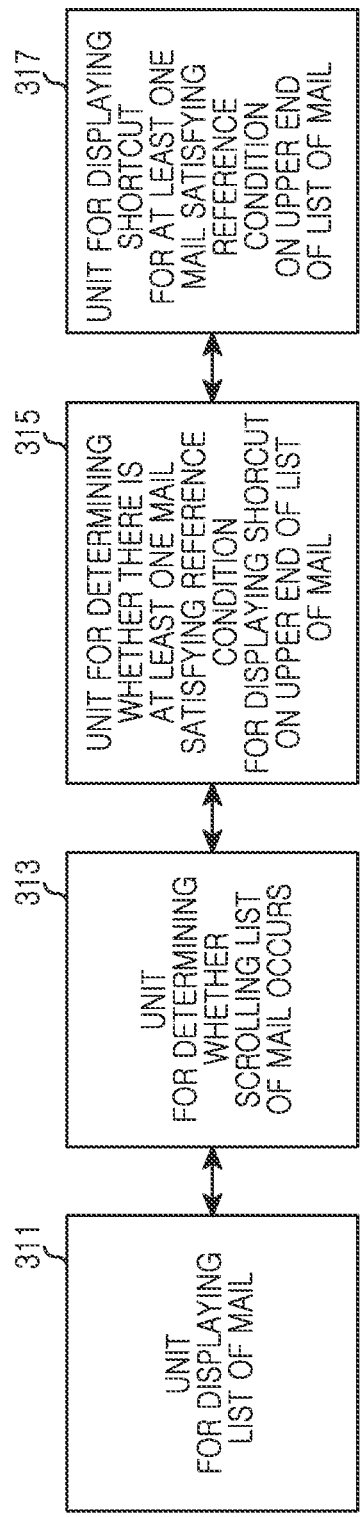
FIG. 3B is a schematic diagram of an electronic device for displaying, on an upper end of a list of mail, a shortcut for at least one mail that satisfies a call reference condition according to an embodiment of an embodiment of the present disclosure.

As described above, each procedure for displaying, on the upper end of a list of mail, a shortcut for at least one mail satisfying a reference condition in the electronic device may be implemented with units for displaying, on the upper end of a list of mail, a shortcut for at least one mail satisfying a reference condition in the electronic device as illustrated in FIG. 3B.

FIG. 3B is a schematic diagram of an electronic device for displaying, on an upper end of a list of mail, a shortcut for at least one mail that satisfies a call reference condition according to an embodiment of an embodiment of the present disclosure.

Referring to FIG. 3B, the electronic device may include a list display unit 311 for displaying a list of mail, a scrolling check unit 313 for determining whether scrolling on the list of mail occurs, a mail check unit 315 for determining whether there is at least one mail that satisfies a reference condition for displaying a shortcut on the upper end of the list of mail, and a shortcut display unit 317 for displaying, on the upper end of the list of mail, a shortcut for at least one mail satisfying the reference condition.

The list display unit 311 displays a list of mail. For example, the electronic device displays the list of mail on the display unit 160 as illustrated in FIG. 9A, if a mail service is executed according to input information provided through the input unit 170.

The scrolling check unit 313 determines whether scrolling on the list of mail occurs. For example, the electronic device determines, on the basis of input information provided through the input unit 170, whether dragging from the first point 903 to the second point 905 is detected. If the scrolling on the list of mail does not occur, the electronic device maintains a display of the list of mail.

The mail check unit 315 determines whether there is at least one mail that satisfies the reference condition for displaying the shortcut on the upper end of the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

The shortcut display unit 317 displays, on the upper end of the list of mail, the shortcut for at least one mail that satisfies the reference condition. The process of displaying the shortcut for a mail on the upper end of the list of mail is assumed to include the process of updating the list of mail. For example, if the mail address "teamleader@lkpat.com" is a set mail address, the electronic device displays a mail 931 including the mail address "teamleader@lkpat.co.kr" 923 as illustrated in FIG. 9A, as a shortcut on the upper end of the list of mail 901 as illustrated in FIG. 9B. As another example, if the word "notice" is a set keyword, the electronic device may display 951 a mail including the word "notice" 941 as illustrated in FIG. 9C, as a shortcut on the upper end of the list of mail 901 as illustrated in FIG. 9D. In this case, the electronic device may display a menu 935 and 955 for canceling a display of a shortcut for a mail or storing the mail in a separate mail folder.

Furthermore, if the scrolling on the list of mail occurs, the electronic device may determine whether there is a mail that satisfies the reference condition, if the scrolling speed is equal to or higher than a reference speed.

As described above, the electronic device may include separate units for displaying, on the upper end of a list of mail, a shortcut for at least one mail satisfying a reference condition. In this case, the electronic device may include a single integrated unit for displaying, on the upper end of a list of mail, a shortcut for at least one mail satisfying a reference condition.

Figure 4:
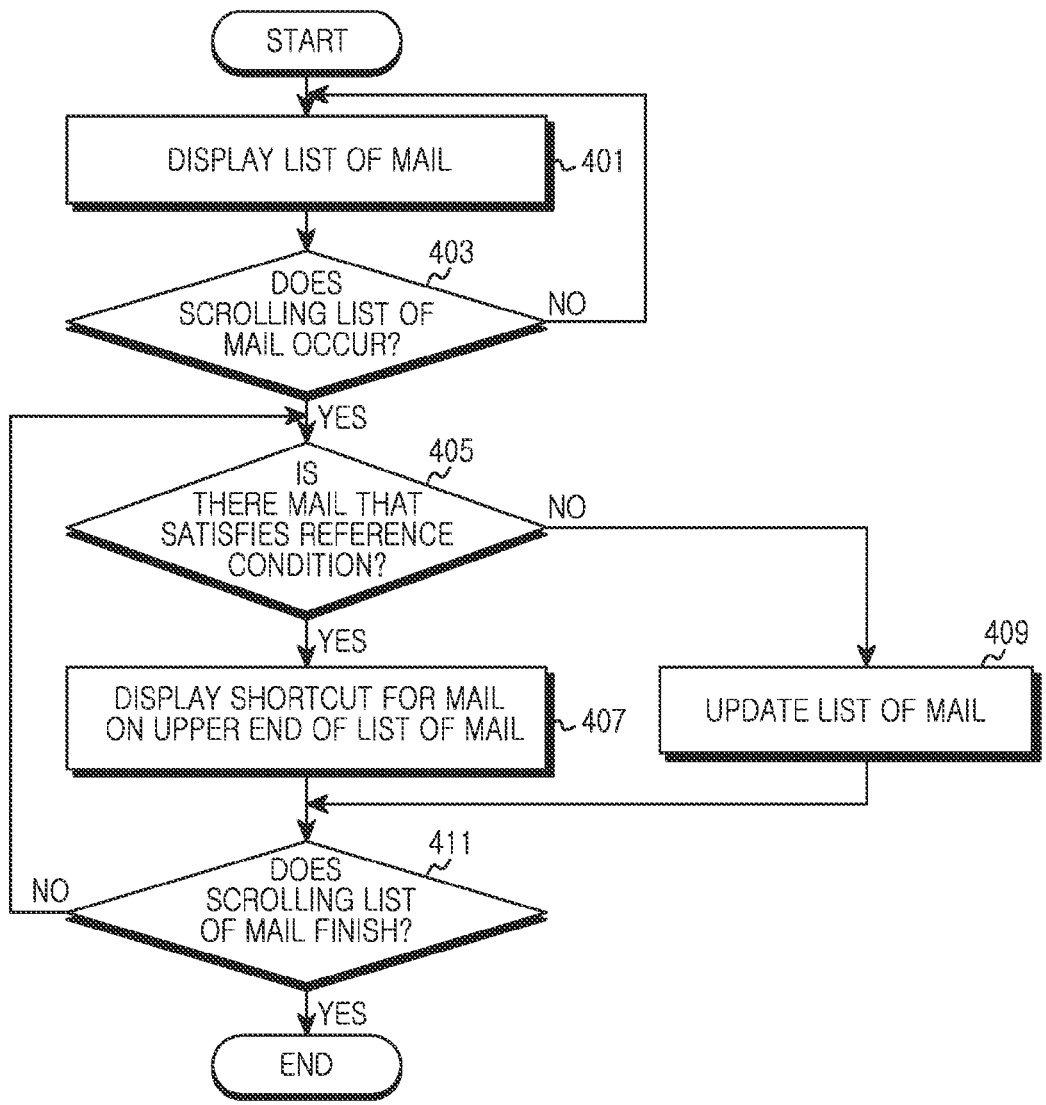
FIG. 4 is a flow chart of a procedure for displaying, on an upper end of a list of mail, a shortcut for at least one mail that satisfies a reference condition in an electronic device according to an embodiment of the present disclosure.

FIG. 4 is a flow chart of a procedure for displaying, on an upper end of a list of mail, a shortcut for at least one mail that satisfies a reference condition in an electronic device according to an embodiment of the present disclosure.

Referring to FIG. 4, at operation 401, the electronic device displays a list of mail. For example, as illustrated in FIG. 9A, the electronic device displays a list of mail 901 on the display unit 160, if a mail service is executed according to input information provided through the input unit 170.

After displaying the list of mail at operation 401, the electronic device proceeds to operation 403 at which the electronic device determines whether scrolling on the list of mail occurs. For example, as illustrated in FIG. 9A, the electronic device determines, on the basis of input information provided through the input unit 170, whether dragging from a first point 903 to a second point 905 is detected.

If the electronic device determines that the scrolling on the list of mail does not occur at operation 403, then the electronic device proceeds to operation 401 at which the electronic device maintains a display of the list of mail.

In contrast, if the electronic device determines that the scrolling on the list of mail occurs at operation 403, then the electronic device proceeds to operation 405 at which the electronic device determines whether there is a mail that satisfies a reference condition. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

If the electronic device determines that there is no mail that satisfies the reference condition at operation 405, then the electronic device proceeds to operation 409 at which the electronic device updates the list of mail. For example, as illustrated in FIG. 9A, if dragging from the first point 903 to the second point 905 is detected, the electronic device updates the list of mail 901 in consideration of the dragged distance and direction. In this case, the electronic device may display a scrolled location through a scroll bar 907 on a mail screen. For example, if dragging is performed from the first point 903 to the second point 905, the electronic device may display a scrolled location from a third point 909 to a fourth point 911.

In contrast, if the electronic device determines that there is a mail that satisfies the reference condition at operation 405, the electronic device proceeds to operation 407 at which the electronic device displays a shortcut for a mail on the upper end of the list of mail. The process of displaying the shortcut for a mail on the upper end of the list of mail is assumed to include the process of updating the list of mail. For example, as illustrated in FIG. 9B, if the mail address "teamleader@lkpat.com" is a set mail address as illustrated in FIG. 9A, the electronic device displays a mail 931 including the mail address "teamleader@lkpat.co.kr" 923, as a shortcut on the upper end of the list of mail 901. As another example, as illustrated in FIG. 9D, if the word "notice" is a set keyword as illustrated in FIG. 9C, the electronic device may display a mail 951 including the word "notice" 941, as a shortcut on the upper end of the list of mail 901. In this case, the electronic device may display a menu 935 and 955 for canceling a display of a shortcut for a mail or storing the mail in a separate mail folder.

After updating the list of mail at operation 409, the electronic device proceeds to operation 411 and determines whether scrolling on the list of mail finishes.

If the electronic device determines that the scrolling on the list of mail does not finish at operation 411, then the electronic device proceeds to operation 405 and determines whether there is a mail that satisfies the reference condition.

In contrast, if the electronic device determines that the scrolling on the list of mail finishes, the electronic device terminates the process.

Figure 5:
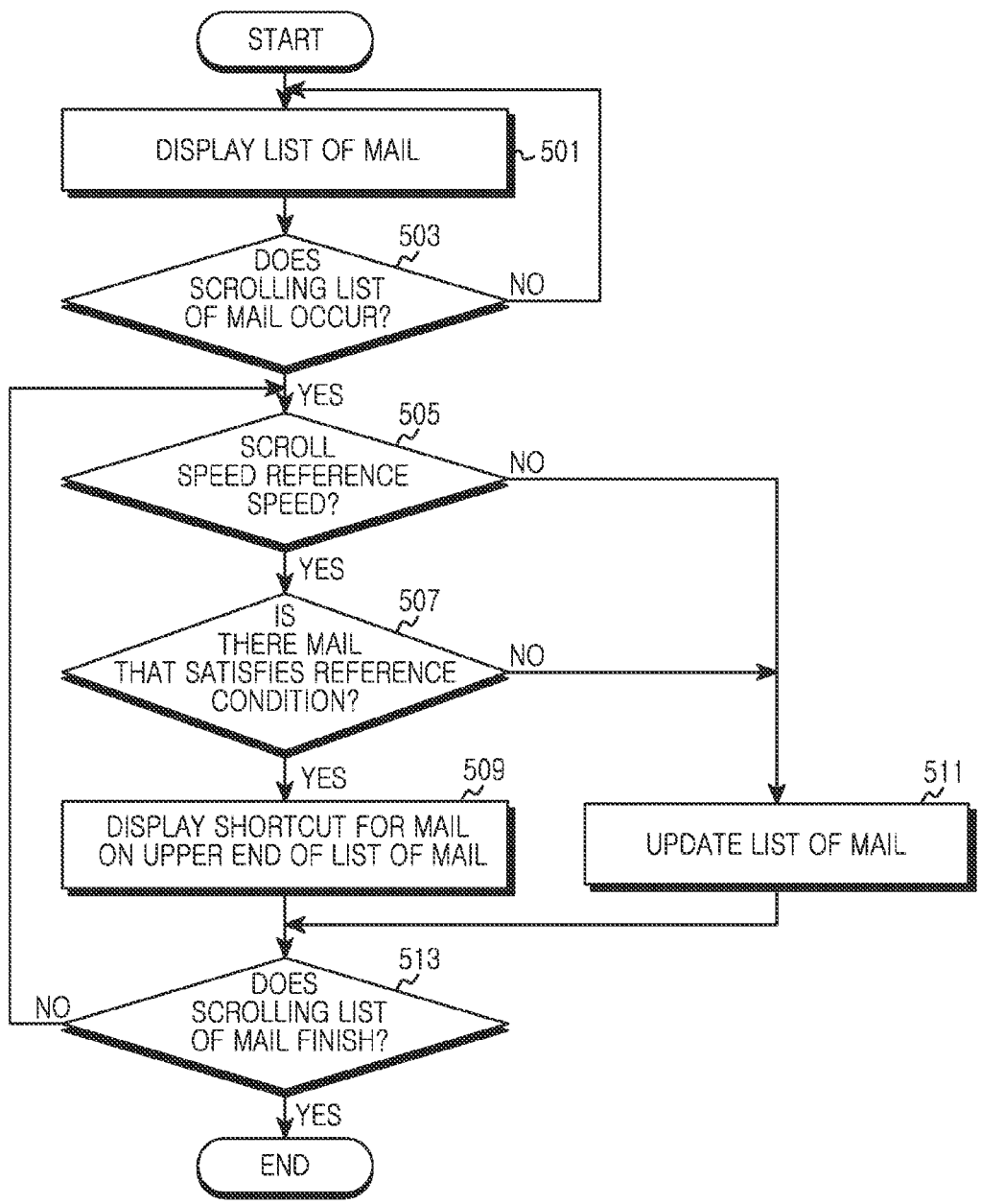
FIG. 5 is a flow chart of a procedure for displaying, on an upper end of a list of mail, a shortcut for at least one mail that satisfies a reference condition in an electronic device according to an embodiment of the present disclosure.

FIG. 5 is a flow chart of a procedure for displaying, on an upper end of a list of mail, a shortcut for at least one mail that satisfies a reference condition in an electronic device according to an embodiment of the present disclosure.

Referring to FIG. 5, at operation 501, the electronic device displays a list of mail. For example, as illustrated in FIG. 9A, the electronic device displays the list of mail 901 on the display unit 160, if a mail service is executed according to input information provided through the input unit 170.

After displaying the list of mail at operation 501, the electronic device proceeds to operation 503 at which the electronic device determines whether scrolling on the list of mail occurs. For example, as illustrated in FIG. 9A, the electronic device determines, on the basis of input information provided through the input unit 170, whether dragging from a first point 903 to a second point 905 is detected.

If the electronic device determines that the scrolling on the list of mail does not occur at operation 503, then the electronic device proceeds to operation 501 at which the electronic device maintains a display of the list of mail.

In contrast, if the electronic device determines that the scrolling on the list of mail occurs, the electronic device proceeds to operation 505 at which the electronic device determines whether the scrolling speed is equal to or higher than a reference speed. For example, as illustrated in FIG. 9A, if dragging from the first point 903 to the second point 905 is detected, the electronic device may check the speed of the scrolling on the list of mail in consideration of the distance and time dragged from the first point 903 to the second point 905 as illustrated in FIG. 9A. As another example, if the scrolling on the list of mail occurs, the electronic device may check the speed of the scrolling on the list of mail in consideration of a speed at which a mail moves on the list of mail.

If the electronic device determines that the scrolling speed is lower than a reference speed at operation 505, then the electronic device proceeds to operation 511 at which the electronic device updates the list of mail. For example, as illustrated in FIG. 9A, if dragging from the first point 903 to the second point 905 is detected, the electronic device updates the list of mail 901 in consideration of the dragged distance and direction. In this case, the electronic device may display a scrolled location through a scroll bar 907 on a mail screen. For example, if dragging is performed from the first point 903 to the second point 905, the electronic device may display a scrolled location from a third point 909 to a fourth point 911.

In contrast, if the electronic device determines that the scrolling speed is equal to or higher than the reference speed at operation 505, then the electronic device proceeds to operation 507 at which the electronic device determines whether there is a mail that satisfies the reference condition. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

If the electronic device determines that there is no mail that satisfies the reference condition at operation 507, then the electronic device proceeds to operation 511 at which the electronic device updates the list of mail.

In contrast, if the electronic device determines that there is a mail that satisfies the reference condition at operation 507, then the electronic device proceeds to operation 509 at which the electronic device displays a shortcut for a mail on the upper end of the list of mail. The process of displaying the shortcut for a mail on the upper end of the list of mail is assumed to include the process of updating the list of mail. For example, if the mail address "teamleader@lkpat.com" is a set mail address as illustrated in FIG. 9A, then, as illustrated in FIG. 9B, the electronic device displays 931 a mail including the mail address "teamleader@lkpat.co.kr" 923 as a shortcut on the upper end of the list of mail 901. As another example, if the word "notice" is a set keyword as illustrated in FIG. 9C, then, as illustrated in FIG. 9D, the electronic device may display 951 a mail including the word "notice" 941 as a shortcut on the upper end of the list of mail 901. In this case, the electronic device may display a menu 935 and 955 for canceling a display of a shortcut for a mail or storing the mail in a separate mail folder.

After updating the list of mail at operation 511, the electronic device proceeds to operation 513 at which the electronic device determines whether scrolling on the list of mail finishes.

If the electronic device determines that the scrolling on the list of mail does not finish at operation 513, then the electronic device proceeds to operation 505 at which the electronic device determines whether there is a mail that satisfies the reference condition.

In contrast, if the electronic device determines that the scrolling on the list of mail finishes at operation 513, then the electronic device terminates this process.

Figure 6A:
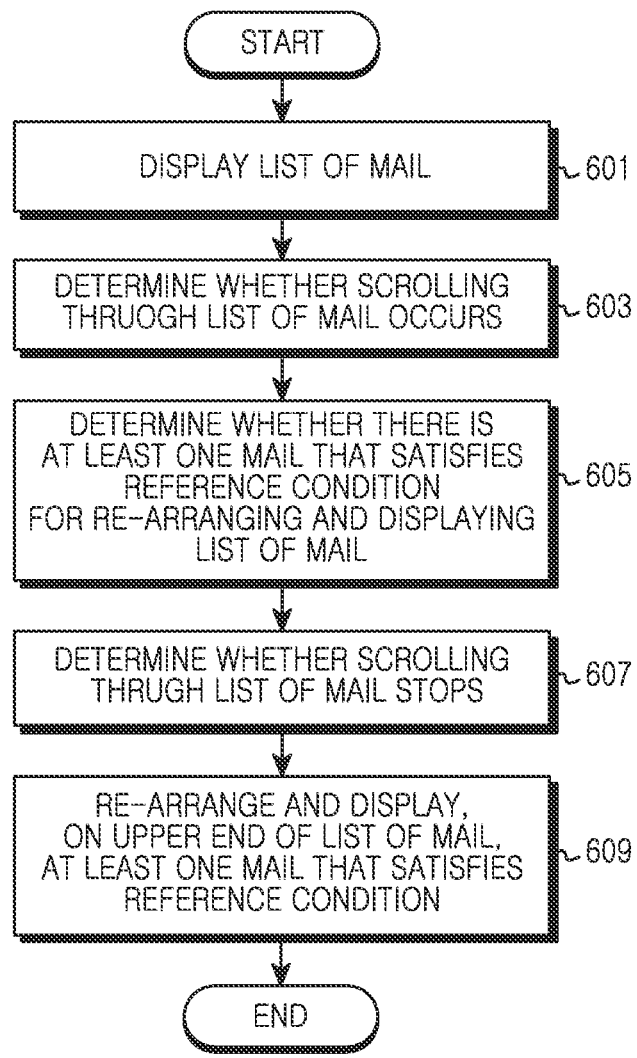
FIG. 6A is a flow chart of a procedure for re-arranging and displaying, on an upper end of a list of mail, at least one mail that satisfies a reference condition in an electronic device according to an embodiment of the present disclosure.

FIG. 6A is a flow chart of a procedure for re-arranging and displaying, on an upper end of a list of mail, at least one mail that satisfies a reference condition in an electronic device according to an embodiment of the present disclosure.

Referring to FIG. 6A, at operation 601, the electronic device displays a list of mail. For example, as illustrated in FIG. 9A, the electronic device displays the list of mail 901 on the display unit 160, if a mail service is executed according to input information provided through the input unit 170.

After displaying the list of mail at operation 601, the electronic device proceeds to operation 603 at which the electronic device determines whether scrolling on the list of mail occurs. For example, as illustrated in FIG. 9A, the electronic device determines, on the basis of input information provided through the input unit 170, whether dragging from a first point 903 to a second point 905 is detected. If the scrolling on the list of mail does not occur, the electronic device maintains a display of the list of mail.

If the electronic device determines that the scrolling on the list of mail occurs, the electronic device proceeds to operation 605 at which the electronic device determines whether there is at least one mail that satisfies a reference condition for re-arranging and displaying the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

Thereafter, the electronic device proceeds to operation 607 at which the electronic device determines whether the scrolling on the list of mail finishes.

If the scrolling on the list of mail finishes, the electronic device re-arranged and displays, on the upper end of the list of mail, at least one mail that satisfies the reference condition. For example, if the mail address "teamleader@lkpat.com" is a set mail address as illustrated in FIG. 9A, then, as illustrated in FIG. 9B, the electronic device displays 931 a mail including the mail address "teamleader@lkpat.co.kr" 923 on the upper end of the list of mail 901. As another example, if the word "notice" is a set keyword as illustrated in FIG. 9C, then, as illustrated in FIG. 9D, the electronic device may re-arrange and display 951 a mail including the word "notice" 941 on the upper end of the list of mail 901. In this case, the electronic device may display a menu 935 and 955 for canceling a display of the re-arranged mail or storing the mail in a separate mail folder.

Furthermore, if the scrolling on the list of mail occurs, the electronic device may determine whether there is a mail that satisfies the reference condition, if the scrolling speed is equal to or higher than a reference speed.

Thereafter, the electronic device terminates this process.

As described above, each procedure for re-arranging and displaying, on the upper end of a list of mail, at least one mail satisfying a reference condition in the electronic device may be implemented with units for re-arranging and displaying, on the upper end of a list of mail, at least one mail satisfying a reference condition in the electronic device as illustrated in FIG. 3B.

Figure 6B:
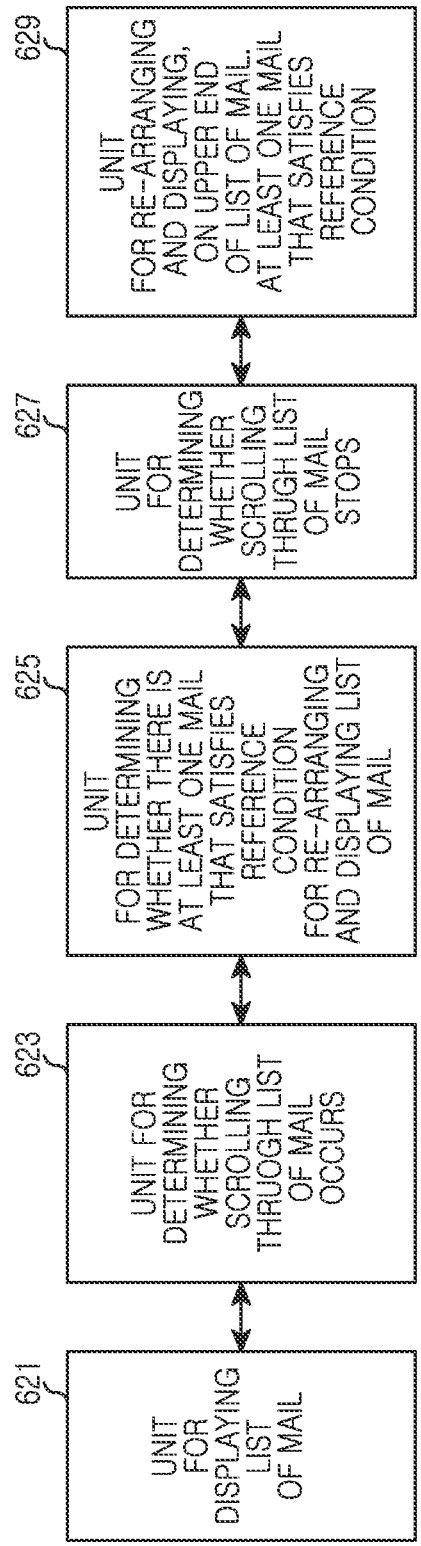
FIG. 6B is a schematic diagram of an electronic device for re-arranging and displaying, on an upper end of a list of mail, at least one mail that satisfies a call reference condition according to an embodiment of the present disclosure.

FIG. 6B is a schematic diagram of an electronic device for re-arranging and displaying, on an upper end of a list of mail, at least one mail that satisfies a call reference condition according to an embodiment of the present disclosure.

Referring to FIG. 6B, the electronic device may include a list update unit 621 for updating a list of mail, a scrolling check unit 623 for determining whether scrolling on the list of mail occurs, a mail check unit 625 for determining whether there is at least one mail that satisfies a reference condition for re-arranging the list of mail, a scrolling stop check unit 627 for determining whether the scrolling on the list of mail stops, and a mail display unit 629 for re-arranging and displaying, on the upper end of the list of mail, at least one mail that satisfies the reference condition.

The list updates unit 621 displays the list of mail. For example, if a mail service is executed according to input information provided through the input unit 170, the electronic device displays the list of mail 901 on the display unit 160 as illustrated in FIG. 9A.

The scrolling check unit 623 determines whether the scrolling on the list of mail occurs. For example, the electronic device determines, on the basis of input information provided through the input unit 170, whether dragging from the first point 903 to the second point 905 is detected. If the scrolling on the list of mail does not occur, the electronic device maintains a display of the list of mail.

The mail check unit 625 determines whether there is at least one mail that satisfies a reference condition for re-arranging and displaying the list of mail. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

The scrolling stop check unit 627 determines whether the scrolling on the list of mail stops.

The mail display unit 629 re-arranges and displays, on the upper end of the list of mail, at least one mail that satisfies the reference condition. For example, if the mail address "teamleader@lkpat.com" is a set mail address as illustrated in FIG. 9A, then, as illustrated in FIG. 9B, the electronic device displays 931 a mail including the mail address "teamleader@lkpat.co.kr" 923 on the upper end of the list of mail 901. As another example, if the word "notice" is a set keyword as illustrated in FIG. 9C, then, as illustrated in FIG. 9D, the electronic device may re-arrange and display a mail 951 including the word "notice" 941 on the upper end of the list of mail 901. In this case, the electronic device may display a menu 935 and 955 for canceling a display of the re-arranged mail or storing the mail in a separate mail folder.

Furthermore, if the scrolling on the list of mail occurs, the electronic device may determine whether there is a mail that satisfies the reference condition, if the scrolling speed is equal to or higher than a reference speed.

As described above, the electronic device may include separate units for re-arranging and displaying, on the upper end of a list of mail, at least one mail satisfying a reference condition. In this case, the electronic device may include a single integrated unit for re-arranging and displaying, on the upper end of a list of mail, at least one mail satisfying a reference condition.

Figure 7:
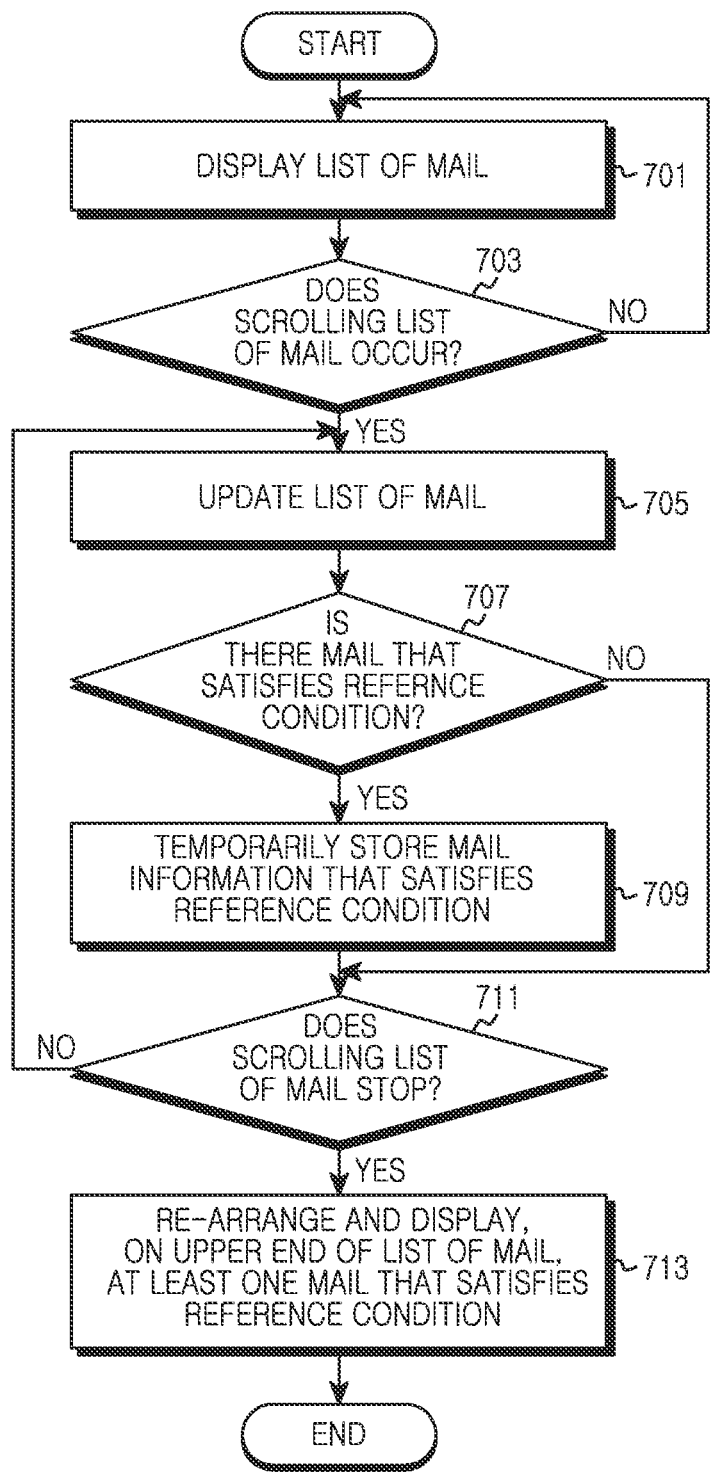
FIG. 7 is a flow chart of a procedure for re-arranging and displaying, on an upper end of a list of mail, at least one mail that satisfies a reference condition in an electronic device according to an embodiment of the present disclosure.

FIG. 7 is a flow chart of a procedure for re-arranging and displaying, on an upper end of a list of mail, at least one mail that satisfies a reference condition in an electronic device according to an embodiment of the present disclosure.

Referring to FIG. 7, at operation 701, the electronic device displays a list of mail. For example, as illustrated in FIG. 9A, the electronic device displays the list of mail on the display unit 160, if a mail service is executed according to input information provided through the input unit 170.

After displaying the list of mail at operation 701, the electronic device proceeds to operation 703 at which the electronic device determines whether scrolling on the list of mail occurs. For example, as illustrated in FIG. 9A, the electronic device determines, on the basis of input information provided through the input unit 170, whether dragging from the first point 903 to the second point 905 is detected.

If the electronic device determines that the scrolling on the list of mail does not occur at operation 703, then the electronic device proceeds to operation 701 at which the electronic device maintains a display of the list of mail.

In contrast, if the electronic device determines that the scrolling on the list of mail occurs at operation 703, then the electronic device proceeds to operation 705 at which the electronic device updates the list of mail. For example, as illustrated in FIG. 9A, if dragging from the first point 903 to the second point 905 is detected, the electronic device updates the list of mail 901 in consideration of the dragged distance and direction. In this case, the electronic device may display a scrolled location through a scroll bar 907 on a mail screen. For example, if dragging is performed from the first point 903 to the second point 905, the electronic device may display a scrolled location from a third point 909 to a fourth point 911.

After updating the list of mail at operation 705, the electronic device proceeds to operation 707 at which the electronic device determines whether there is a mail that satisfies the reference condition. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

If the electronic device determines that there is no mail that satisfies the reference condition at operation 707, then the electronic device proceeds to operation 711 at which the electronic device determines whether the scrolling on the list of mail stops.

In contrast, if the electronic device determines that there is a mail that satisfies the reference condition, the electronic device proceeds to operation 709 at which the electronic device temporarily stores information on the mail that satisfies the reference condition. For example, if the mail address "teamleader@lkpat.com" is a set mail address as illustrated in FIG. 9A, the electronic device temporarily stores mail information including the mail address "teamleader@lkpat.co.kr" 923 in the memory 110. As another example, if the word "notice" is a set keyword as illustrated in FIG. 9C, the electronic device temporarily stores information on the mail including the word "notice" 941 in the memory 110.

After temporarily storing information on the mail that satisfies the reference condition at operation 709, the electronic device proceeds to operation 711 at which the electronic device determines whether the scrolling on the list of mail stops.

If the electronic device determines that the scrolling on the list of mail does not stop at operation 711, then the electronic device proceeds to operation 705 at which the electronic device updates the list of mail.

In contrast, if the electronic device determines that the scrolling on the list of mail stops at operation 711, then the electronic device proceeds to operation 713 at which the electronic device re-arranges and displays, on the upper end of the list of mail, at least one mail that satisfies the reference condition.

For example, if the mail address "teamleader@lkpat.com" is a set mail address as illustrated in FIG. 9A, then, as illustrated in FIG. 9B, the electronic device re-arranges and displays 931 a mail including the mail address "teamleader@lkpat.co.kr" 923 on the upper end of the list of mail 901. As another example, if the word "notice" is a set keyword as illustrated in FIG. 9C, then, as illustrated in FIG. 9D, the electronic device may re-arrange and display a mail 951 including the word "notice" 941 on the upper end of the list of mail 901. In this case, the electronic device may display a menu 935 and 955 for canceling a display of the re-arranged mail or storing it in a separate mail folder.

Thereafter, the electronic device terminates this process.

Figure 8:
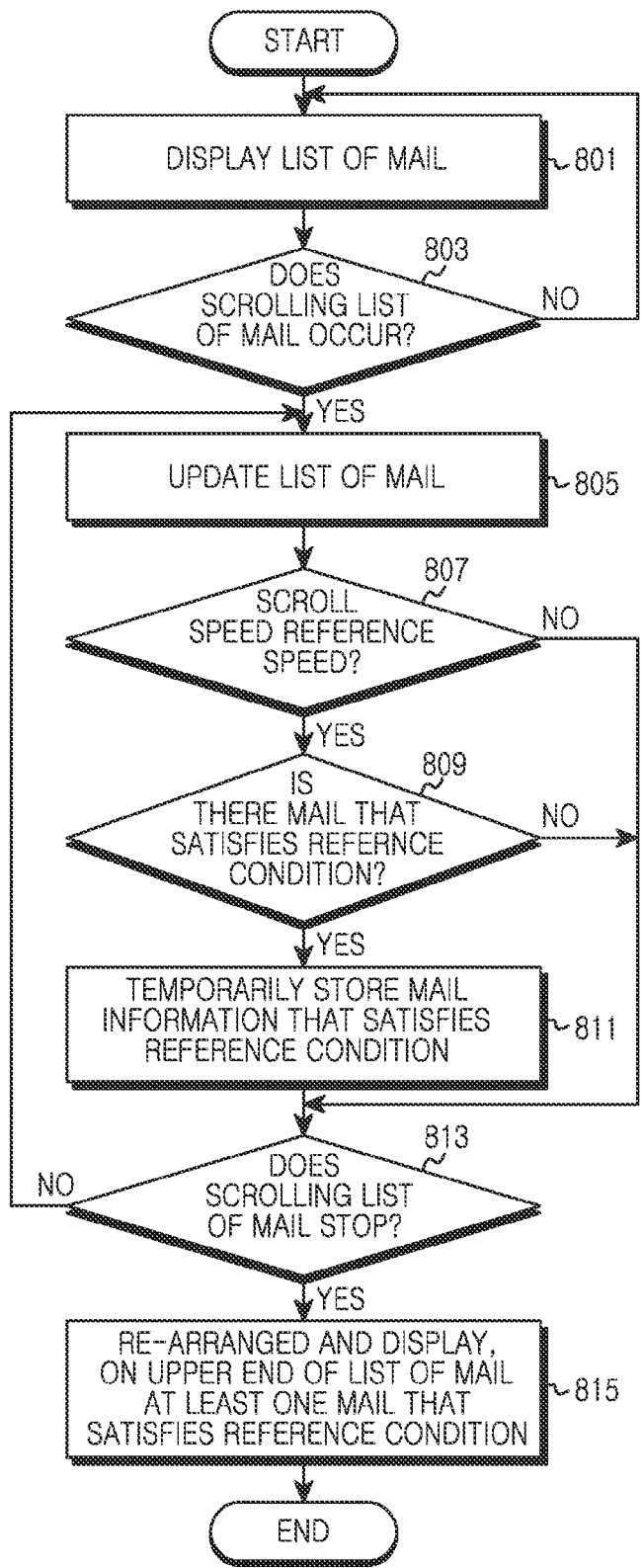
FIG. 8 is a flow chart of a procedure for re-arranging and displaying, on an upper end of a list of mail, at least one mail that satisfies a reference condition in an electronic device according to an embodiment of the present disclosure.

FIG. 8 is a flow chart of a procedure for re-arranging and displaying, on an upper end of a list of mail, at least one mail that satisfies a reference condition in an electronic device according to an embodiment of the present disclosure.

Referring to FIG. 8, at operation 801, the electronic device displays a list of mail. For example, as illustrated in FIG. 9A, the electronic device displays a list of mail 901, if a mail service is executed according to input information provided through the input unit 170.

After displaying the list of mail at operation 801, the electronic device proceeds to operation 803 at which the electronic device determines whether scrolling on the list of mail occurs. For example, as illustrated in FIG. 9A, the electronic device determines, on the basis of input information provided through the input unit 170, whether dragging from the first point 903 to the second point 905 is detected.

If the electronic device determines that the scrolling on the list of mail does not occur at operation 803, then the electronic device proceeds to operation 701 at which the electronic device maintains a display of the list of mail.

In contrast, if the electronic device determines that the scrolling on the list of mail occurs at operation 803, the electronic device proceeds to operation 805 at which the electronic device updates the list of mail. For example, as illustrated in FIG. 9A, if dragging from the first point 903 to the second point 905 is detected, the electronic device updates the list of mail 901 in consideration of the dragged distance and direction. In this case, the electronic device may display a scrolled location through a scroll bar 907 on a mail screen. For example, if dragging is performed from the first point 903 to the second point 905, the electronic device may display a scrolled location from a third point 909 to a fourth point 911.

After updating the list of mail at operation 805, the electronic device proceeds to operation 807 at which the electronic device determines whether the scrolling speed is equal to or higher than a reference speed. For example, if dragging from the first point 903 to the second point 905 is detected as illustrated in FIG. 9A, the electronic device may check the speed of the scrolling on the list of mail in consideration of the distance and time dragged from the first point 903 to the second point 905 as illustrated in FIG. 9A. As another example, if the scrolling on the list of mail occurs, the electronic device may check the speed of the scrolling on the list of mail in consideration of the speed at which a mail moves on the list of mail.

If the electronic device determines that the scrolling speed is lower than the reference speed at operation 807, then the electronic device proceeds to operation 813 at which the electronic device determines whether the scrolling on the list of mail stops.

In contrast, if the electronic device determines that the scrolling speed is equal to or higher than the reference speed at operation 807, then the electronic device proceeds to operation 809 at which the electronic device determines whether there is a mail that satisfies a reference condition. The mail that satisfies the reference condition may include at least one of a mail that includes a mail address set to an electronic device, a mail that includes a keyword set to the electronic device in at least one of the title and the body, a mail that includes a mail address corresponding to those mail sent from the electronic device, a mail that includes a mail address corresponding to those mail sent from the electronic device during a reference period, a mail that includes a mail address corresponding to those mail checked by the electronic device, and a mail that includes a mail address corresponding to those mail checked by the electronic device during a reference period.

If the electronic device determines that there is no mail that satisfies the reference condition at operation 809, then the electronic device proceeds to operation 811 at which the electronic device determines whether the scrolling on the list of mail stops.

In contrast, if the electronic device determines that there is a mail that satisfies the reference condition at operation 809, the electronic device proceeds to operation 811 at which the electronic device temporarily stores information on the mail that satisfies the reference condition. For example, if the mail address "teamleader@lkpat.com" is a set mail address as illustrated in FIG. 9A, the electronic device temporarily stores mail information including the mail address "teamleader@lkpat.co.kr" 923 in the memory 110. As another example, if the word "notice" is a set keyword as illustrated in FIG. 9C, the electronic device temporarily stores mail information including the word "notice" 941 in the memory 110.

After temporarily storing information on the mail that satisfies the reference condition at operation 811, the electronic device proceeds to operation 813 at which the electronic device determines whether the scrolling on the list of mail stops.

If the electronic device determines that the scrolling on the list of mail does not stop at operation 813, then the electronic device proceeds to operation 805 at which the electronic device updates the list of mail.

In contrast, if the electronic device determines that the scrolling on the list of mail stops, then the electronic device proceeds to operation 815 at which the electronic device re-arranges and displays, on the upper end of the list of mail, at least one mail that satisfies the reference condition. For example, if the mail address "teamleader@lkpat.com" is a set mail address as illustrated in FIG. 9A, then, as illustrated in FIG. 9B, the electronic device re-arrange and displays 931 a mail including the mail address "teamleader@lkpat.co.kr" 923 on the upper end of the list of mail 901. As another example, if the word "notice" is a set keyword as illustrated in FIG. 9C, then, as illustrated in FIG. 9D, the electronic device may re-arrange and display a mail 951 including the word "notice" 941 on the upper end of the list of mail 901. In this case, the electronic device may display a menu 935 and 955 for canceling a display of the re-arranged mail or storing the mail in a separate mail folder.

Thereafter, the electronic device terminates this process.

As described above, various embodiments of the present disclosure display at least one item satisfying a reference condition on the upper end of a list when scrolling on the list occurs in an electronic device, and thus various embodiments of the present disclosure have an advantage in that an electronic device user may check important items if there are numerous items.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing a list in an electronic device, the method comprising:
    displaying the list comprising a plurality of items;
    detecting that a scrolling input is received on the list;
    determining at least one item that satisfies a reference condition, among the plurality of items, in response to the detecting that the scrolling input is received on the list; and
    displaying, on an upper part of the list, a shortcut for the determined at least one item while the list is scrolled based on the received scrolling input.

2. The method of claim 1, wherein, if the list is a mail list, the determining of the at least one item that satisfies the reference condition comprises:
    determining at least one of:
        a mail that includes a predetermined originating address,
        a mail that includes a predetermined keyword in at least one of a title of the mail or a body of the mail,
        a mail that includes a predetermined destination address from among mails sent from the electronic device,
        a mail that is sent from the electronic device during a reference period,
        a mail that is checked as received by the electronic device, or a mail that is checked as received by the electronic device during a reference period.

3. The method of claim 1, further comprising:
determining a speed of scrolling on the list; and
determining at least one item that satisfies the reference condition, if the speed of the scrolling on the list is equal to or higher than a reference speed.

4. The method of claim 3, wherein the determining of the speed of the scrolling on the list comprises:
determining the speed of the scrolling on the list in consideration of a dragged distance and a dragged time, if dragging is performed from a first point to a second point on the list.

5. The method of claim 3, wherein the determining of the speed of the scrolling on the list comprises:
determining the speed of the scrolling on the list in consideration of a speed at which items are scrolled and moved on the list.

6. The method of claim 1, further comprising:
displaying, after displaying the shortcut for the at least one item on the upper part of the list, displaying a menu for storing the determined at least one item in a memory of the electronic device.

7. A method of managing a list in an electronic device, the method comprising:
displaying the list comprising a plurality of items;
detecting that a scrolling input is received on the list;
determining at least one item that satisfies a reference condition, among the plurality of items, in response to detecting that the scrolling input is received on the list; and
in response to detecting that a scrolling on the list stops, displaying, on an upper part of the displayed list, the determined at least one item and the scrolled list.

8. The method of claim 7, wherein if the list is a mail list, the determining of the at least one item that satisfies the reference condition comprises:
determining at least one of:
a mail that includes a predetermined originating address,
a mail that includes a predetermined keyword in at least one of a title of the mail or a body of the mail,
a mail that includes a predetermined destination address from among mails sent from the electronic device,
a mail that is sent from the electronic device during a reference period,
a mail that is checked a receipt by the electronic device, or
a mail that is checked as received by the electronic device during a reference period.

9. The method of claim 7, further comprising:
determining a speed of scrolling on the list; and
determining at least one item that satisfies the reference condition, if the speed of the scrolling on the list is equal to or higher than a reference speed.

10. The method of claim 9, wherein the determining of the speed of the scrolling on the list comprises:
determining the speed of the scrolling on the list in consideration of a dragged distance and a dragged time, if dragging is performed from a first point to a second point on the list.

11. The method of claim 9, wherein the determining of the speed of the scrolling on the list comprises:
determining the speed of the scrolling on the list in consideration of a speed at which items are scrolled and moved on the list.

12. The method of claim 7, further comprising:
after displaying the determined at least one item on the upper part of the list, displaying a menu for storing the determined at least one item in a memory of the electronic device.

13. An electronic device comprising:
at least one processor;
at least one memory; and
at least one program stored in the memory,
wherein the at least one program is configured to be executable by the at least one processor, and
wherein the at least one processor is configured to:
control a display of the electronic device to display a list comprising a plurality of items,
detect that a scrolling input is received on the list
determine at least one item that satisfies a reference condition, among the plurality of items, in response to detecting that the scrolling input is received on the list, and
control the display to display, on an upper part of the list, a shortcut for the determined at least one item while the list is scrolled based on the received scrolling input.

14. The electronic device of claim 13, wherein the at least one processor is further configured to determine at least one of:
a mail that includes a predetermined originating address,
a mail that includes a predetermined keyword in at least one of a title of the mail or a body of the mail,
a mail that includes a predetermined destination address from among mails sent from the electronic device,
a mail that is sent from the electronic device during a reference period,
a mail that is checked as received by the electronic device, or
a mail that is checked as received by the electronic device during a reference period, if the list is a mail list.

15. The electronic device of claim 13, wherein the at least one processor is further configured to:
determine a speed of scrolling on the list, and
determine at least one item that satisfies the reference condition, if the speed of the scrolling on the list is equal to or higher than a reference speed.

16. The electronic device of claim 15, wherein the at least one processor is further configured to determine the speed of the scrolling on the list in consideration of a dragged distance and a dragged time, if dragging is performed from a first point to a second point on the list.

17. The electronic device of claim 15, wherein the at least one processor is further configured to determine the speed of the scrolling on the list in consideration of a speed at which items are scrolled and moved on the list.

18. The electronic device of claim 13, wherein, after displaying the shortcut for the at least one item on the upper part of the list, the at least one processor is further configured to control the display to display a menu for storing the determined at least one item in a memory of the electronic device.

19. An electronic device comprising:
at least one processor;
at least one memory; and
at least one program stored in the memory,
wherein the at least one program is configured to be executable by the at least one processor, and
wherein the at least one processor is configured to:
control a display of the electronic device to display a list comprising a plurality of items, detect that a scrolling input is received on the list, determine at least one item that satisfies a reference condition, among the plurality of items, in response to detecting that the scrolling input is received on the list, and in response to detecting that a scrolling on the list stops, control the display to display, on an upper part of the displayed list, the determined at least one item and the scrolled list.

20. The electronic device of claim 19, wherein the at least one processor is further configured to determine at least one of:

a mail that includes a predetermined originating address, a mail that includes a predetermined keyword in at least one of a title of the mail or a body of the mail, a mail that includes a predetermined destination address from among mails sent from the electronic device, a mail that is sent from the electronic device during a reference period, a mail that is checked as received by the electronic device, or a mail that is checked as received by the electronic device during a reference period, if the list is a mail list.

21. The electronic device of claim 19, wherein the at least one processor is further configured to:

determine a speed of scrolling on the list; and determine at least one item that satisfies the reference condition, if the speed of the scrolling on the list is equal to or higher than a reference speed.

22. The electronic device of claim 21, wherein the at least one processor is further configured to determine the speed of the scrolling on the list in consideration of a dragged distance and a dragged time, if dragging is performed from a first point to a second point on the list.

23. The electronic device of claim 21, wherein the at least one processor is further configured to determine the speed of the scrolling on the list in consideration of a speed at which items are scrolled and moved on the list.

24. The electronic device of claim 19, wherein, after the displaying of the determined at least one item on the upper part of the list, the at least one processor is further configured to control the display to display a menu for storing the determined at least one item in a memory of the electronic device.

25. A non-transitory computer-readable storage medium storing instructions that, when executed, cause at least one processor to perform the method of claim 1.

* * * * *